United States Patent
Sadaki et al.

(10) Patent No.: US 10,950,828 B2
(45) Date of Patent: *Mar. 16, 2021

(54) SURFACE-TREATED STEEL SHEET FOR BATTERY CONTAINERS

(71) Applicant: TOYO KOHAN CO., LTD., Tokyo (JP)

(72) Inventors: Kota Sadaki, Yamaguchi (JP); Koh Yoshioka, Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/780,929

(22) PCT Filed: Dec. 5, 2016

(86) PCT No.: PCT/JP2016/086120
§ 371 (c)(1),
(2) Date: Jun. 1, 2018

(87) PCT Pub. No.: WO2017/094920
PCT Pub. Date: Jun. 8, 2017

(65) Prior Publication Data
US 2018/0347061 A1    Dec. 6, 2018

(30) Foreign Application Priority Data

Dec. 3, 2015 (JP) .............................. JP2015-236710

(51) Int. Cl.
*B32B 15/01* (2006.01)
*C25D 5/50* (2006.01)
(Continued)

(52) U.S. Cl.
CPC ......... *H01M 2/0287* (2013.01); *B32B 15/013* (2013.01); *B32B 15/015* (2013.01);
(Continued)

(58) Field of Classification Search
CPC ... C25D 7/00; C25D 5/50; C25D 5/48; C25D 3/12; C23C 30/00; C23C 30/005;
(Continued)

(56) References Cited

U.S. PATENT DOCUMENTS

2005/0089752 A1    4/2005  Ohmura et al.
2006/0083981 A1    4/2006  Mori et al.
(Continued)

FOREIGN PATENT DOCUMENTS

CN    1314009 A    9/2001
CN    1647293 A    7/2005
(Continued)

OTHER PUBLICATIONS

Panasonic Industrial AA(LR6XWA), downloaded from b2b-api.panasonic.eu (two pages), Jun. 2009. (Year: 2009).*

(Continued)

*Primary Examiner* — Michael E. La Villa
(74) *Attorney, Agent, or Firm* — Muncy, Geissler, Olds & Lowe, P.C.

(57) ABSTRACT

A surface-treated steel sheet for a battery container, including a steel sheet, an iron-nickel diffusion layer formed on the steel sheet, and a nickel layer formed on the iron-nickel diffusion layer and constituting the outermost layer, wherein when the Fe intensity and the Ni intensity are continuously measured from the surface of the surface-treated steel sheet for a battery container along the depth direction with a high frequency glow discharge optical emission spectrometric analyzer, the thickness of the iron-nickel diffusion layer being the difference between the depth at which the Fe intensity exhibits a first predetermined value and the depth at which the Ni intensity exhibits a second predetermined value is 0.04 to 0.31 µm; and the total amount of the nickel (Continued)

contained in the iron-nickel diffusion layer and the nickel contained in the nickel layer is 10.8 to 26.7 g/m².

8 Claims, 6 Drawing Sheets

(51) Int. Cl.
| | |
|---|---|
| C25D 3/12 | (2006.01) |
| H01M 2/02 | (2006.01) |
| C25D 7/00 | (2006.01) |
| C23C 28/02 | (2006.01) |
| C23C 10/20 | (2006.01) |
| C23C 10/30 | (2006.01) |
| C23C 10/02 | (2006.01) |
| C23C 10/18 | (2006.01) |
| C23C 10/28 | (2006.01) |
| C25D 5/48 | (2006.01) |
| B32B 15/04 | (2006.01) |
| C23C 10/08 | (2006.01) |
| C23C 30/00 | (2006.01) |
| B32B 15/18 | (2006.01) |
| C23C 10/60 | (2006.01) |
| H01M 2/10 | (2006.01) |
| H01M 2/04 | (2006.01) |

(52) U.S. Cl.
CPC ............ *B32B 15/04* (2013.01); *B32B 15/043* (2013.01); *B32B 15/18* (2013.01); *C23C 10/02* (2013.01); *C23C 10/08* (2013.01); *C23C 10/18* (2013.01); *C23C 10/20* (2013.01); *C23C 10/28* (2013.01); *C23C 10/30* (2013.01); *C23C 10/60* (2013.01); *C23C 28/02* (2013.01); *C23C 28/021* (2013.01); *C23C 28/023* (2013.01); *C23C 30/00* (2013.01); *C23C 30/005* (2013.01); *C25D 3/12* (2013.01); *C25D 5/48* (2013.01); *C25D 5/50* (2013.01); *C25D 7/00* (2013.01); *H01M 2/02* (2013.01); *H01M 2/022* (2013.01); *H01M 2/026* (2013.01); *H01M 2/0292* (2013.01); *H01M 2/1055* (2013.01); *B32B 2250/03* (2013.01); *B32B 2311/22* (2013.01); *B32B 2311/30* (2013.01); *B32B 2439/00* (2013.01); *H01M 2/0486* (2013.01); *H01M 2002/0297* (2013.01); *Y02E 60/10* (2013.01); *Y10T 428/12937* (2015.01); *Y10T 428/12944* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01); *Y10T 428/12993* (2015.01); *Y10T 428/2495* (2015.01); *Y10T 428/24942* (2015.01); *Y10T 428/24967* (2015.01); *Y10T 428/24975* (2015.01); *Y10T 428/263* (2015.01); *Y10T 428/264* (2015.01); *Y10T 428/265* (2015.01); *Y10T 428/27* (2015.01)

(58) Field of Classification Search
CPC ..... C23C 28/023; C23C 28/02; C23C 28/021; C23C 10/02; C23C 10/18; C23C 10/20; C23C 10/28; C23C 10/30; C23C 10/08; C23C 10/60; H01M 2/02; H01M 2/0287; H01M 2/0486; H01M 2/022; H01M 2/026; H01M 2/0292; H01M 2/1055; H01M 2002/0297; B32B 2439/00; B32B 2311/30; B32B 2311/22; B32B 2250/03; B32B 15/015; B32B 15/013; B32B 15/04; B32B 15/043; B32B 15/18; Y10T 428/12994; Y10T 428/12951; Y10T 428/12958; Y10T 428/12965; Y10T 428/12972; Y10T 428/12937; Y10T 428/12979; Y10T 428/12993; Y10T 428/24942; Y10T 428/2495; Y10T 428/24967; Y10T 428/24975; Y10T 428/263; Y10T 428/264; Y10T 428/265; Y10T 428/27; Y10T 428/12944; Y02E 60/10

See application file for complete search history.

(56) References Cited

U.S. PATENT DOCUMENTS

| | | |
|---|---|---|
| 2008/0305392 A1 | 12/2008 | Ohmura et al. |
| 2009/0311595 A1 | 12/2009 | Mori et al. |
| 2011/0159355 A1 | 6/2011 | Ohmura et al. |
| 2012/0231329 A1 | 9/2012 | Ohmura et al. |
| 2014/0147735 A1 | 5/2014 | Ohmura et al. |
| 2015/0162576 A1 | 6/2015 | Horie et al. |
| 2018/0347061 A1 | 12/2018 | Sadaki et al. |
| 2018/0351138 A1* | 12/2018 | Asada ................. C25D 5/50 |
| 2018/0366691 A1* | 12/2018 | Sadaki ................ C25D 5/50 |

FOREIGN PATENT DOCUMENTS

| | | |
|---|---|---|
| CN | 103597626 A | 2/2014 |
| CN | 108291323 A | 7/2018 |
| CN | 108368628 A | 8/2018 |
| CN | 108368629 A | 8/2018 |
| EP | 1498963 A1 | 1/2005 |
| EP | 2441532 A1 | 4/2012 |
| EP | 2472631 A1 | 7/2012 |
| JP | 06002104 | 1/1994 |
| JP | 2006093095 | 4/2006 |
| JP | 4817724 B2 | 11/2011 |
| JP | 2013170308 | 9/2013 |
| JP | 20149401 | 1/2014 |
| WO | WO03098718 A1 | 11/2003 |
| WO | WO2009107318 A1 | 9/2009 |
| WO | WO2014007025 A1 | 1/2014 |
| WO | WO2014156002 | 10/2014 |

OTHER PUBLICATIONS

Chinese Office Action dated Jul. 3, 2019 in CN Application No. 201680070779.1.
European Search Report dated Mar. 14, 2019 in EP App. No. 16870853.5.
European Search Report dated Mar. 14, 2019 in EP App. No. 16870854.3.
European Search Report dated Apr. 4, 2019 in EP App. No. 16870855.0.
Office Action dated Dec. 10, 2019 in U.S. Appl. No. 15/780,862, 27 pages.
European Office Action cited in counterpart application No. 16 870 853.5, dated Feb. 19, 2020, 4 pages.
European Office Action cited in counterpart application No. 16 870 854.3, dated Feb. 19, 2020, 4 pages.
European Office Action cited in counterpart application No. 16 870 855.0, dated Feb. 19, 2020, 4 pages.
Office Action dated Mar. 26, 2020 in related U.S. Appl. No. 15/780,862.
Office Action dated Mar. 17, 2020 in related CN Application No. 201680070718.5.
Official Action issued in corresponding CN patent application No. 201680070779.1 dated May 12, 2020 (with English translation).
Official Action issued in corresponding JP patent application No. 2017-554215 dated Jun. 30, 2020 (with English translation).
Official Action issued in corresponding JP patent application No. 2017-554216 dated Jun. 30, 2020 (with English translation).

(56) References Cited

OTHER PUBLICATIONS

Official Action issued in corresponding JP patent application No. 2017-554217 dated Jun. 30, 2020 (with English translation).
Official Action issued in corresponding U.S. Appl. No. 15/780,935 dated Jun. 19, 2020.
Office Action dated Aug. 10, 2020 in CN Application No. 201680070719.X (14 pages).
Chinese Office Action in application No. 201680070719.X dated Jul. 16, 2019 and its English translation; pp. 1-13.
Chinese Office Action with English Translation, cited in counterpart application CN201680070718.5, dated Sep. 24, 2020, 13 pages.
Office Action dated Dec. 14, 2020 in U.S. Appl. No. 15/780,935 (12 pages).

* cited by examiner

SURFACE-TREATED STEEL SHEET FOR BATTERY CONTAINERS

TECHNICAL FIELD

The present invention relates to a surface-treated steel sheet for a battery container.

BACKGROUND ART

Recently, portable devices such as audio instruments and cellular phones have been used in various fields, and there have been used as the operating power sources thereof many primary batteries such as alkaline batteries and many secondary batteries such as nickel-hydrogen batteries and lithium-ion batteries. Such batteries are demanded to achieve long operating lives, high performances and the like by the achievement of high performances of the devices being mounted with such batteries, and the battery containers packed with power generation elements composed of positive electrode active materials, negative electrode active materials and the like are also demanded to be improved in the performances as the important constituent elements of the batteries.

As the surface-treated steel sheets to form such battery containers, for example, Patent Documents 1 and 2 disclose surface-treated steel sheets each prepared by forming a nickel plating layer an a steel sheet, and then forming an iron-nickel diffusion layer by applying a heat treatment to the nickel plated steel sheet.

On the other hand, battery containers having a thin battery container wall (hereinafter, referred to as "can wall") have been demanded in order to improve the volume percentage, under the requirements for the achievement of higher capacities and lighter weights of batteries. For example, as disclosed in Patent Documents 3 and 4, it has been known a processing allowing the thickness of the can wall after the processing to be thinner than the thickness of a surface-treated steel sheet before the processing.

RELATED ART

Patent Documents

Patent Document 1: Japanese Patent Laid-Open No. 2014-009401
Patent Document 2: Japanese Patent Laid-Open No. 6-2104
Patent Document 3: International Publication No. WO 2009/107318
Patent Document 4: International Publication No. WO 2014/156002

SUMMARY OF THE INVENTION

Problem to be Solved by the Invention

However, in Patent Documents 1 and 2, the heat treatment condition in the formation of the iron-nickel diffusion layer is a high temperature or a long time, and the inter-diffusion between the iron in the steel sheet serving as a substrate and the nickel in the nickel plating layer tends to proceed in the resulting surface-treated steel sheet. The present inventors have obtained a finding that when a heat treatment is performed under the conventional heat treatment conditions, use of a battery with the surface treated steel sheet processed into a battery container sometimes increases the amount of iron dissolved from the inner surface of the battery container, and the corrosion resistance is liable to be decreased. The iron exposed during formation of the battery container is favorable for improving the battery properties; however a study performed by the present inventors have revealed that when thickness of the nickel plating layer formed before heat treatment is thin, the exposure of the iron is locally increased. With increased dissolution amount, the corrosion resistance is liable to be decreased.

In addition, in Patent Documents 3 and 4, there is a problem that by reducing the thickness of the can wall of the battery container, the amount of iron dissolved an the inner surface of the battery container sometimes comes to be increased, and the corrosion resistance of the inner surface of the battery container is decreased.

An object of the present invention is to provide a surface-treated steel sheet for a battery container excellent in corrosion resistance even when the volume percentage is improved by reducing the thickness of the can wall in the case where the surface-treated steel sheet is processed into a battery container.

Means for Solving the Problem

According to the present invention, there is provided a surface-treated steel sheet for a battery container, including a steel sheet, an iron-nickel diffusion layer formed an the steel sheet, and a nickel layer formed on the iron-nickel diffusion layer and constituting the outermost surface layer, wherein when the Fe intensity and the Ni intensity are continuously measured along the depth direction from the surface of the surface-treated steel sheet for a battery container, by using a high frequency glow discharge optical emission spectrometric analyzer, the thickness of the iron-nickel diffusion layer, being the difference (D2–D1) between the depth (D1) at which the Fe intensity exhibits a first predetermined value and the depth (D2) at which the Ni intensity exhibits a second predetermined value, is 0.04 to 0.31 µm, and the total amount of nickel contained in the iron-nickel diffusion layer and the nickel layer is 10.8 to 26.7 g/m².

It is to be noted that the depth (D1) exhibiting the first predetermined value is the depth exhibiting an intensity of 10% of the saturated value of the Fe intensity measured by the above-described measurement, and the depth (D2) exhibiting the second predetermined value is the depth exhibiting an intensity of 10% of the maximum value when the measurement is further performed along the depth direction after the Ni intensity shows the maximum value by the above-described measurement.

In the surface-treated steel sheet for a battery container of the present invention, the ratio of the thickness of the iron-nickel diffusion layer to the thickness of the nickel layer (thickness of iron-nickel diffusion layer/thickness of nickel layer) is preferably 0.013 to 0.5.

In the surface-treated steel sheet for a battery container of the present invention, the thickness of the nickel layer is preferably 1.0 µm or more.

In the surface-treated steel sheet for a battery container of the present invention, the Vickers hardness (HV) of the nickel layer measured with a load of 10 gf is preferably 220 to 280.

According to the present invention, there is provided a battery container made of the above-described surface-treated steel sheet for a battery container.

According to the present invention, there is also provided a battery provided with the above-described battery container.

Moreover, according to the present invention, there is provided a method for producing a surface-treated steel sheet for a battery container, including: a nickel plating step of forming a nickel plating layer with a nickel amount of 10.8 to 26.7 g/m$^2$; and a heat treatment step of applying a heat treatment to the steel sheet having the nickel plating layer formed thereon by maintaining the steel sheet at a temperature of 450 to 600° C. for 30 seconds to 2 minutes.

Effects of Invention

According to the present invention, it is possible to provide a surface-treated steel sheet for a battery container excellent in corrosion resistance even when the volume percentage is improved by reducing the thickness of the can wall when a battery container is made of the surface-treated steel sheet for a battery container. Moreover, according to the present invention, it is possible to provide a battery container and a battery obtained by using such a surface-treated steel sheet for a battery container.

DESCRIPTION OF EMBODIMENTS

Hereinafter, one Embodiment of the present invention is described by way of the accompanying drawings. The surface-treated steel sheet for a battery container according to the present invention is processed into an external shape corresponding to the desired shape of a battery. Examples of a battery may include, without being particularly limited to: primary batteries such as an alkaline battery, and secondary batteries such as a nickel-hydrogen battery and a lithium-ion battery; as the members of the battery containers of these batteries, the surface-treated steel sheet for a battery container according to the present invention can be used. Hereinafter, the present invention is described on the basis of an embodiment using the surface-treated steel sheet for a battery container according to the present invention for a positive electrode can constituting the battery container of an alkaline battery.

Figure 1:
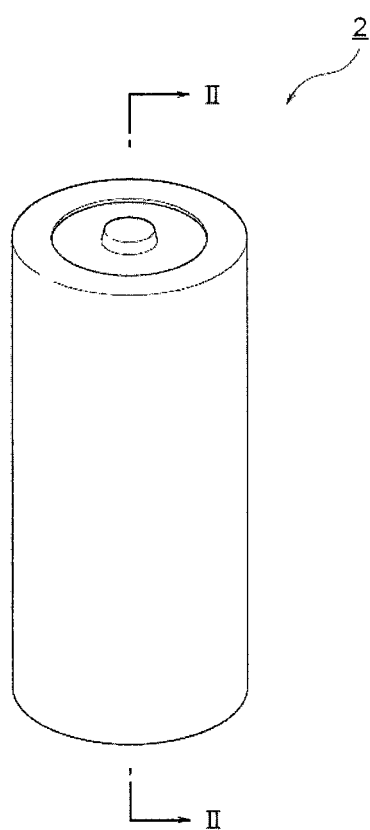
FIG. 1 is an oblique perspective view showing one embodiment of a battery undergoing an application of the surface-treated steel sheet for a battery container according to the present invention.
Figure 2:
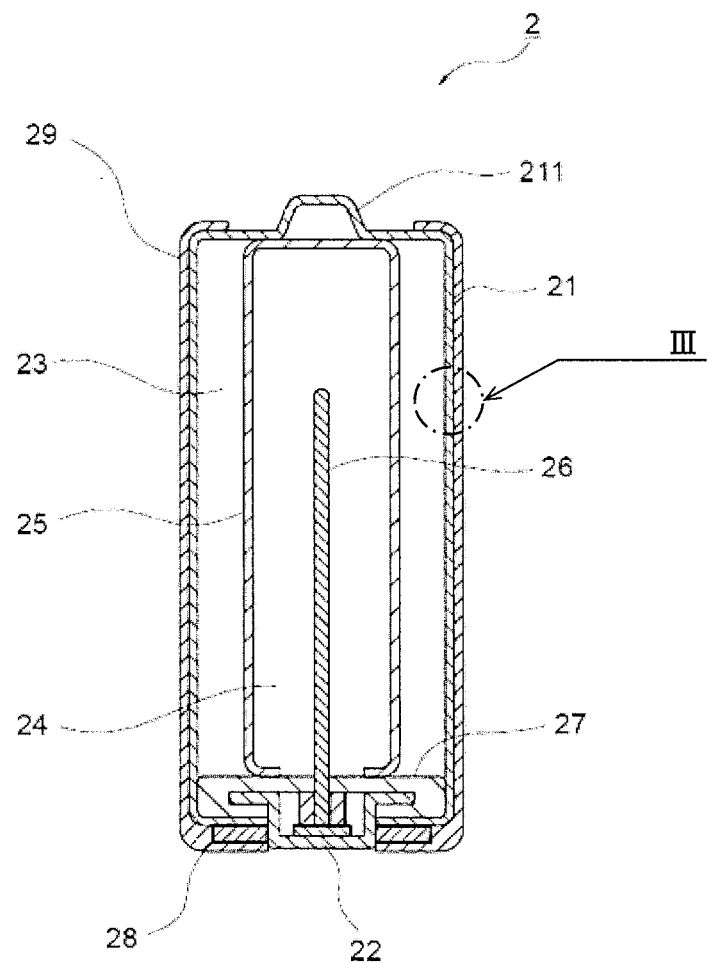
FIG. 2 is a cross-sectional view along the line II-II in FIG. 1.

FIG. 1 is an oblique perspective view showing one embodiment of an alkaline battery 2 undergoing an application of the surface-treated steel sheet for a battery container according to the present invention, and FIG. 2 is a cross-sectional view along the line II-II in FIG. 1. The alkaline battery 2 of the present example includes a positive electrode mixture 23 and a negative electrode mixture 24 filled inside the positive electrode can 21 having a bottomed cylindrical shape through the intermediary of a separator 25; and a sealing body constituted with a negative electrode terminal 22, a current collector 26 and a gasket 27 caulked an the inner surface side of the opening section of the positive electrode can 21. A convex positive electrode terminal 211 is formed in the bottom center of the positive electrode can 21. In addition, an exterior case 29 is mounted on the positive electrode can 21 through the intermediary of an insulating ring 28, for the purpose of imparting insulation properties, improving the design, and the like.

The positive electrode can 21 of the alkaline battery 2 shown in FIG. 1 is obtained by mold-processing the surface-treated steel sheet for a battery container according to the present invention, by applying, for example, a deep drawing processing method, a drawing and ironing processing method (DI processing method), a drawing thin and redrawing processing method (DTR processing method), or a processing method using a stretch processing and an ironing processing after a drawing processing. Hereinafter, with reference to FIG. 3, the constitution of the surface-treated steel sheet for a battery container (surface-treated steel sheet 1) according to the present invention is described.

Figure 3:
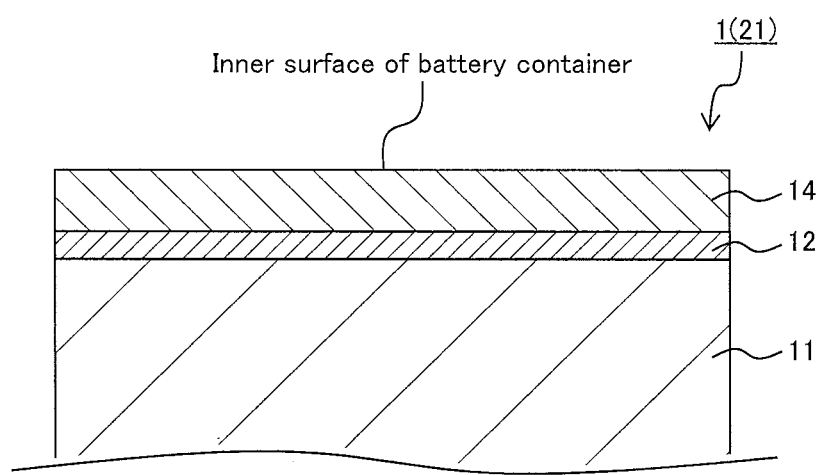
FIG. 3 is an enlarged cross-sectional view of the portion III in FIG. 2, in one embodiment of the surface-treated steel sheet for a battery container of the present invention.

FIG. 3 is an enlarged cross-sectional view of the portion III of the positive electrode can 21 shown in FIG. 2, and the upper side in FIG. 3 corresponds to the inner surface (the surface in contact with the positive electrode mixture 23 of the alkaline battery 2) of the alkaline battery 2 of FIG. 1. The surface-treated steel sheet 1 of the present embodiment includes, as shown in FIG. 3, an iron-nickel diffusion layer 12 and a nickel layer 14 formed on a steel sheet 11 constituting the substrate of the surface-treated steel sheet 1.

In the surface-treated steel sheet 1 of the present embodiment, the thickness of the iron-nickel diffusion layer 12 measured by a high frequency glow discharge optical emission spectrometric analyzer is 0.04 to 0.31 μm, and the total amount of the nickel contained in the iron-nickel diffusion layer 12 and the nickel layer 14 is 10.8 to 26.7 g/m$^2$. Herewith, the surface-treated steel sheet 1 of the present embodiment is excellent in corrosion resistance even in the case where the thickness of the can wall is reduced to improve the volume percentage when the surface-treated steel sheet 1 is processed into a battery container.

<Steel Sheet 11>

The steel sheet 11 of the present embodiment is not particularly limited as long as the steel sheet 11 is excellent in molding processability; for example, a low carbon aluminum-killed steel (carbon content: 0.01 to 0.15% by weight), a low carbon steel having a carbon content of 0.003% by weight or less, or a non-aging low carbon steel prepared by adding Ti, Nb or the like to a low carbon steel can be used. The thickness of the steel sheet is not particularly limited, but is preferably 0.2 to 0.5 nm. When the steel sheet is too thick, the heat quantity necessary for diffusion is deficient, and the diffusion layer is liable to be formed insufficiently. When the steel sheet is too thin, the thickness necessary as the subsequent battery sometimes cannot be secured, or the heat conduction is fast and the control of the thickness of the diffusion layer is liable to be difficult.

In the present embodiment, the hot rolled sheets of these steels are washed with an acid to remove the scales (oxide film), then cold rolled, then electrolytically washed, then annealed and subjected to temper rolling, and are used as the steel sheets 11; or alternatively, the hot rolled sheets of these steels washed with an acid to remove the scales (oxide film), then cold rolled, then electrolytically washed, then subjected to temper rolling without being subjected to annealing, and are used as the steel sheets 11.

<Iron-Nickel Diffusion Layer 12, and Nickel Layer 14>

In the surface-treated steel sheet 1 of the present embodiment, the iron-nickel diffusion layer 12 is a layer allowing iron and nickel to mutually diffuse therein, formed as a result of a thermal diffusion treatment performed after the nickel plating layer 13 is formed on the steel sheet 11, so as to cause the thermal diffusion of the iron constituting the steel sheet 11 and the nickel constituting the nickel plating layer 13. The nickel layer 14 is a layer derived from the portion free from the diffusion of iron in the vicinity of the surface layer of the nickel plating layer 13, the portion being thermally recrystallized and softened when the thermal diffusion treatment is performed.

By forming the iron-nickel diffusion layer 12 obtained by such a thermal diffusion treatment, when the surface-treated steel sheet 1 is used as a battery container, the direct, wide area contact of the steel sheet with the electrolytic solution or the like constituting the battery can be prevented; and moreover, the presence of the iron-nickel diffusion layer 12 relaxing the potential difference between the nickel of the nickel layer 14 and the iron of the steel sheet 11 allows the corrosion resistance and the battery properties to be satisfactory. The formation of the iron-nickel diffusion layer 12 also allows the adhesiveness between the steel sheet 11 and the nickel layer 14 to be improved.

The nickel plating layer 13 for forming the iron-nickel diffusion layer 12 can be formed on the steel sheet 11 by using, for example, a nickel plating bath. As the nickel plating bath, there can be used a plating bath usually used in nickel plating, namely, a Watts bath, a sulfamate bath, a boron fluoride bath, a chloride bath and the like. For example, the nickel plating layer 13 can be formed by using, as a watts bath, a bath having a bath composition containing nickel sulfate in a concentration of 200 to 350 g/L, nickel chloride in a concentration of 20 to 60 g/L, and boric acid in a concentration of 10 to 50 g/L, under the conditions that the pH is 3.0 to 4.8 (preferably pH is 3.6 to 4.6), the bath temperature is 50 to 70° C., the current density is 10 to 40 A/dm$^2$ (preferably 20 to 30 A/dm$^2$).

It is to be noted that as the nickel plating layer 13, a sulfur-containing bright plating is not preferable because the battery properties are liable to be degraded; however, it is possible in the present invention to apply a matte plating not containing sulfur in an amount equal to or more than the amount of an inevitable impurity as well as a semi-gloss plating. This is because the hardness of the layer obtained by plating is as follows: the semi-gloss plating is harder than the matte plating, but the heat treatment for forming the diffusion layer in the present invention allows the hardness of the semi-gloss plating to be comparable with or slightly higher than the hardness of the matte plating. When a semi-gloss plating is formed as a nickel plating layer, a semi-gloss agent may be added to the above-described plating baths. The semi-gloss agent is not particularly limited as long as the semi-gloss agent allows the nickel plating layer after plating to be free from sulfur (for example, 0.05% or less in an fluorescent X-ray measurement); as the semi-glass agent, it is possible to use, for example, an aliphatic unsaturated alcohol such as a polyoxyethylene adduct of an unsaturated alcohol, an unsaturated carboxylic acid, formaldehyde, and coumarin.

Figure 4:
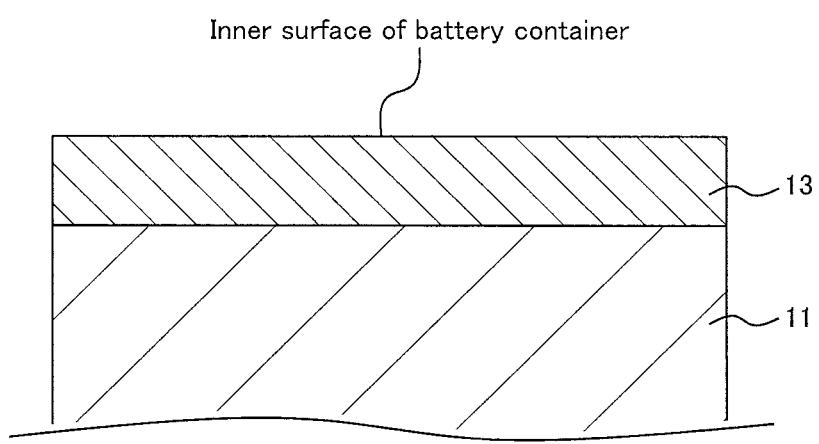
FIG. 4 is a diagram for illustrating the method for producing the surface-treated steel sheet for a battery container shown in FIG. 3.

In the present embodiment, as shown in FIG. 4, the above-described nickel plating layer 13 is formed on the steel sheet 11, and subsequently a thermal diffusion treatment is performed; thus, the iron-nickel diffusion layer 12 and the nickel layer 14 are formed, and the surface-treated steel sheet 1 as shown in FIG. 3 can be obtained.

In the present embodiment, the nickel amount in the nickel plating layer 13 before performing the thermal diffusion treatment corresponds to the total amount of the nickel contained in the iron-nickel diffusion layer 12 and the nickel contained in the nickel layer 14 obtained by the thermal diffusion treatment.

The total amount (the nickel amount in the nickel plating layer 13 before performing the thermal diffusion treatment) of the nickel contained in the iron-nickel diffusion layer 12 and the nickel contained in the nickel layer 14 obtained by the thermal diffusion treatment may be 10.8 to 26.7 g/m, is preferably 13.3 to 26.7 g/n, and is more preferably 17.8 to 25.8 g/m$^2$. When the total amount of the nickel contained in the iron-nickel diffusion layer 12 and the nickel contained in the nickel layer 14 is too small, the improvement effect of the corrosion resistance due to nickel is insufficient, and the corrosion resistance of the obtained surface-treated steel sheet 1 used as a battery container is degraded. On the other hand, when the total amount of the nickel contained in the iron-nickel diffusion layer 12 and the nickel contained in the nickel layer 14 is too large, the can wall thickness of the battery container made of the obtained surface-treated steel sheet 1 comes to be thick and the volume of the interior of the battery container comes to be small (the volume percentage is degraded). In addition, in the case where in the formation of a battery container, a processing is performed in such a way that the can wall thickness at a position of 5 nm from the bottom of the battery can is reduced by 10% or more in relation to the sheet thickness of the surface-treated steel sheet 1, when the total amount of nickel is large, a nickel powder tends to be generated during pressing. When a large amount of the nickel powder attaches to the punch, there is caused a problem that the nickel powder attaches to the inner surface of the formed battery container. The total amount of the nickel contained in the iron-nickel diffusion layer 12 and the nickel contained in the nickel layer 14 can be determined by a method calculating on the basis of the total amount (total weight) of the nickel contained in the iron-nickel diffusion layer 12 and the nickel contained in the nickel layer 14 measurable with an ICP analysis method. Alternatively, the total amount of the nickel contained in the iron-nickel diffusion layer 12 and the nickel contained in the nickel layer 14, can also be determined by a method calculating on the basis of the measured deposition amount obtained by measuring the deposition amount of the nickel atoms constituting the nickel plating layer 13 by performing a fluorescent X-ray measurement after the formation of the nickel plating layer 13 and before performing the thermal diffusion treatment.

The conditions of the thermal diffusion treatment may be appropriately selected according to the thickness of the nickel plating layer 13; the heat treatment temperature is preferably 450 to 600° C., more preferably 480 to 590° C., and further preferably 500 to 550° C.; the soaking time in the heat treatment is preferably 30 seconds to 2 minutes, more preferably 30 to 100 seconds, and further preferably 45 to 90 seconds. In addition, in the heat treatment, the time including the heating up time and the cooling time in addition to the soaking time is preferably 2 to 7 minutes and more preferably 3 to 5 minutes. The thermal diffusion treatment method is preferably a continuous annealing method from the viewpoint of easy regulation of the heat treatment temperature and the heat treatment time within the above-described ranges.

In the present invention, as described above, by performing the thermal diffusion treatment, the iron-nickel diffusion layer 12 can be formed between the steel sheet 11 and the nickel layer 14, and consequently the surface-treated steel sheet 1 is allowed to have a constitution (Ni/Fe-Ni/Fe) having the iron-nickel diffusion layer 12 and the nickel layer 14 on the steel sheet 11 in order from bottom to top.

In the present embodiment, the thickness of the thus formed iron-nickel diffusion layer 12 measured with a high frequency glow discharge optical emission spectrometric analyzer may be 0.04 to 0.31 µm, and is preferably 0.05 to 0.27 µm, more preferably 0.08 to 0.25 µm, and further preferably 0.09 to 0.20 µm. When the thickness of the iron-nickel diffusion layer 12 is too thin, in the obtained surface-treated steel sheet 1, the adhesiveness of the nickel layer 14 is decreased, and moreover, when the surface-treated steel sheet 1 is processed into a battery container, the corrosion resistance is decreased. On the other hand, when the thickness of the iron-nickel diffusion layer 12 is too large, the amount of exposed iron comes to be too large in the nickel layer 14 of the surface-treated steel sheet 1, and consequently, when the surface-treated steel sheet 1 is used as the battery container, the amount of iron dissolved from the inner surface of the battery container is large and the corrosion resistance is degraded.

It is to be noted that the thickness of the iron-nickel diffusion layer 12 can be determined by continuously measuring the variations of the Fe intensity and the Ni intensity in the depth direction from the outermost surface toward the steel sheet 11 with respect to the surface-treated steel sheet 1 by using a high frequency glow discharge optical emission spectrometric analyzer.

Figure 5:
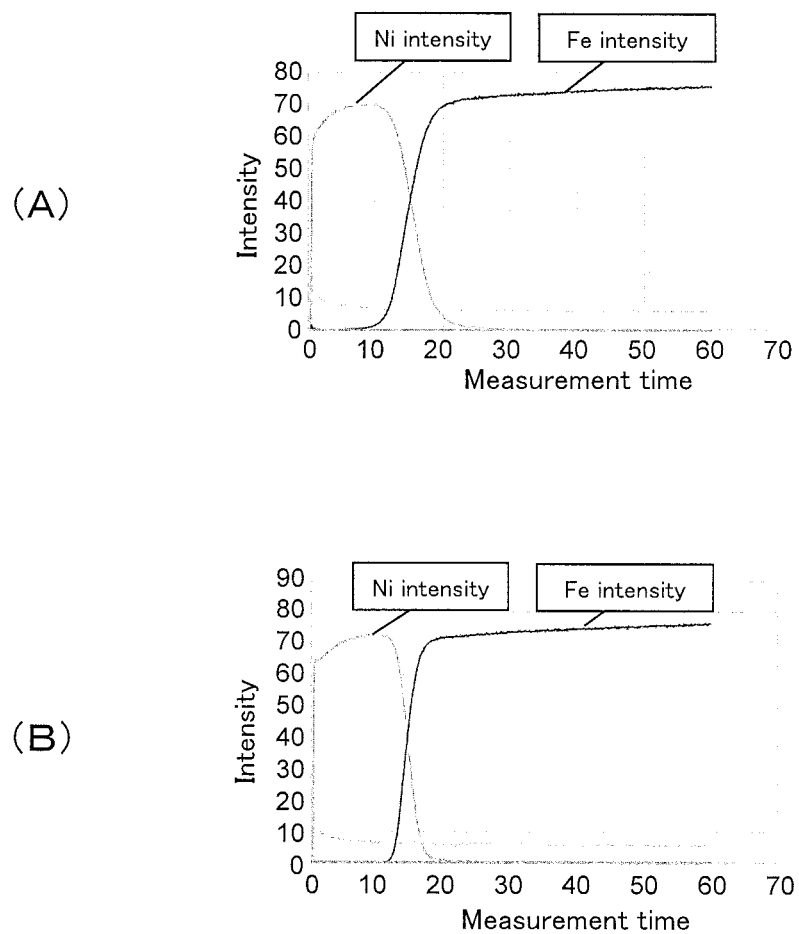
FIG. 5 presents the graphs for illustrating the method for measuring the thickness of an iron-nickel diffusion layer.

Specifically, first, by using the high frequency glow discharge optical emission spectrometric analyzer, the Fe intensity in the surface-treated steel sheet 1 is measured until the Fe intensity is saturated, and by adopting the saturated value of the Fe intensity as a reference, the depth giving the Fe intensity 10% of the saturated value is defined as the boundary between the nickel layer 14 and the iron-nickel diffusion layer 12. For example, the measurement of the thickness of the iron-nickel diffusion layer 12 is described with reference to FIG. 5(A) showing an example of the results obtained by measuring an actually prepared surface-treated steel sheet 1 with a high frequency glow discharge optical emission spectrometric analyzer. It is to be noted that, in FIG. 5(A), the ordinate represents the Fe intensity and the Ni intensity, and the abscissa represents the measurement time when the measurement is performed in the depth direction from the surface of the surface-treated steel sheet 1 by using a high frequency glow discharge optical emission spectrometric analyzer.

In the present embodiment, first, the saturated value of the Fe intensity is determined on the basis of the measurement results of the Fe intensity. The saturated value of the Fe intensity is determined from the time variation rate (Fe intensity variation/second) of the Fe intensity. The time variation rate of the Fe intensity comes to be steeply large when Fe is detected after the start of the measurement, and decreases after passing the maximum value and is stabilized in the vicinity of approximately zero. The value when the time variation rate is stabilized at approximately zero is the saturated value, and specifically, when the time variation rate of the Fe intensity canes to be 0.02 (Fe intensity variation/second) or less, the measurement time in the depth direction can be taken as the measurement time of the saturation of the Fe intensity.

In the example shown in FIG. 5(A), the saturated value of the Fe intensity is a value of approximately 70 in the vicinity of the measurement time of 20 seconds, and the depth giving an Fe intensity of approximately 7, 10% of the saturated value, can be detected as the boundary between the nickel layer 14 and the iron-nickel diffusion layer 12.

On the other hand, the boundary between the iron-nickel diffusion layer 12 and the steel sheet 11 can be detected as follows. Specifically, when the Ni intensity of the surface-treated steel sheet 1 is measured by using a high frequency glow discharge optical emission spectrometric analyzer, the maximum value is extracted from the obtained graph showing the variation of the Ni intensity, and the depth giving a Ni intensity of 10% of the maximum value after the maximum value has been shown is determined as the boundary between the iron-nickel diffusion layer 12 and the steel sheet 11. For example, when FIG. 5(A) is referred to, the maximum value of the Ni intensity is approximately 70 in the vicinity of the measurement time of 9 seconds, and accordingly the depth giving the Ni intensity 10% of the maximum value of the Ni intensity, namely, approximately 7, can be detected as the boundary between the iron-nickel diffusion layer 12 and the steel sheet 11.

In addition, in the present embodiment, on the basis of the boundaries between the layers determined as described above, it is possible to determine the thickness of the iron-nickel diffusion layer 12. Specifically, when the measurement is performed by using a high frequency glow discharge optical emission spectrometric analyzer, the time giving an Fe intensity of 10% of the saturated value of the Fe intensity is set as the starting point, the measurement time until the time giving a Ni intensity of 10% of the maximum value after the Ni intensity has exhibited the maximum value is calculated, and on the basis of the calculated measurement time, the thickness of the iron-nickel diffusion layer 12 can be determined.

In the present invention, as described above, for the nickel-plated steel sheet having a known plating thickness and having undergone no heat treatment, a high frequency glow discharge optical emission spectrometric analysis is performed, the thickness calculated as an iron-nickel diffusion layer is taken as the "reference thickness," and the difference (D2−D1) between D1 and D2 indicates the value obtained by subtracting the reference thickness.

It is to be noted that in the measurement with a high frequency glow discharge optical emission spectrometric analyzer, with the increase of the thickness of the nickel plating layer, the reference thickness calculated from the measurement of the nickel plating layer comes to be increased; thus, when the thickness of the iron-nickel diffusion layer is determined, the reference thickness is checked in the plating deposition amount of each of the layers, or alternatively, it is desirable that the measurement of the reference thickness is performed in each of the two or more samples, different from each other in the plating deposition amount before performing heat treatment, the relation formula between the plating deposition amount and the reference thickness is determined, and then the thickness of the iron-nickel diffusion layer is calculated.

It is to be noted that for the purpose of determining the thickness of the iron-nickel diffusion layer 12 of the surface-treated steel sheet 1 on the basis of the measurement time, the high frequency glow discharge optical emission spectrometric analysis, as shown in FIG. 5(B), of the nickel-plated steel sheet having a known plating thickness and having undergone no thermal diffusion treatment is performed, the thickness calculated as the iron-nickel diffusion layer in FIG. 5(B) is calculated, and the calculated thickness is required to be subtracted at the time of calculation of the iron-nickel diffusion layer 12 of the surface-treated steel sheet 1 as the actual measurement object. Specifically, from the thickness of the iron-nickel diffusion layer 12 portion (the thickness value obtained in FIG. 5(A) as follows: the time giving the Fe intensity of 10% of the saturated value of the Fe intensity is taken as the starting point, the measurement time until the time giving the Ni intensity an intensity of 10% of the maximum value of the Ni intensity after the Ni intensity has exhibited the maximum value thereof is converted into the thickness) calculated from the graph of FIG. 5(A), the thickness calculated in the same manner from the graph of FIG. 5(B) is subtracted, and thus, the thickness of the actual iron-nickel diffusion layer 12 in the graph of FIG. 5(A) can be determined.

In addition, by measuring the nickel-plated steel sheet having undergone no thermal diffusion treatment, the relation between the depth time (the measurement time based on the high frequency glow discharge optical emission spectrometric analyzer) and the actual thickness can be determined, and accordingly, by using this relation (the relation showing the relation between the depth time and the actual thickness), the depth time can be converted into the thickness of the iron-nickel diffusion layer 12 of the surface-treated steel sheet 1 to be the actual measurement object.

It is to be noted that when the thickness of the iron-nickel diffusion layer 12 is measured as described above with a high frequency glow discharge optical emission spectrometric analyzer, sometimes there is a detection limit value of the thickness of the iron-nickel diffusion layer 12, due to the performances of the high frequency glow discharge optical emission spectrometric analyzer, the measurement conditions or the like. For example, when a heat-treated nickel-plated steel sheet 1 prepared by using, as the steel sheet 11, a steel sheet having a surface roughness Ra of 0.05 to 3 µm, as measured with a stylus-type roughness meter, is measured with a measurement diameter of $\phi$5 mm of a high frequency glow discharge optical emission spectrometric analyzer, the detectable region (detection limit value with respect to shape) is approximately 0.04 µm; when the thickness of the iron-nickel diffusion layer 12 measured with the high frequency glow discharge optical emission spectrometric analyzer is equal to or less than the detection limit value, the thickness of the iron-nickel diffusion layer 12 can be regarded to be more than 0 µm and less than 0.04 µm. In other words, in the case where the nickel plating layer 13 is formed on the steel sheet 11, and subsequently the iron-nickel diffusion layer 12 and the nickel layer 14 are formed by performing a thermal diffusion treatment, even when the thickness of the iron-nickel diffusion layer 12 is equal to or less than the detection limit value in the measurement of the thickness of the iron-nickel diffusion layer 12 by using the high frequency glow discharge optical emission spectrometric analyzer, the thickness of the iron-nickel diffusion layer 12 can be regarded to be more than 0 µm and less than 0.04 µm. It is to be noted that when the nickel plating layer 13 is formed on the steel sheet 11, and then a nickel-plated steel sheet is obtained by applying no thermal diffusion treatment, the iron-nickel diffusion layer 12 can be regarded not to be formed in the nickel-plated steel sheet (the thickness of the iron-nickel diffusion layer 12 is 0).

The thickness of the iron-nickel diffusion layer 12 is increased with the increase of the heat treatment temperature, or with the increase of the heat treatment time which allows the mutual diffusion of iron and nickel to proceed easily. Because iron and nickel mutually diffuse, the formed iron-nickel diffusion layer 12 extends on the side of the steel sheet 11 and also diffuses on the side of the nickel plating layer 13, in relation to the interface between the steel sheet 11 and the nickel plating layer 13 before the diffusion. When the heat treatment temperature is set to be too high, or the heat treatment time is set to be too long, the iron-nickel diffusion layer 12 comes to be thick, and the nickel layer 14 canes to be thin. For example, the thickness of the iron-nickel diffusion layer 12 comes to be more than 0.31 µm. The present inventors have discovered that when such a surface-treated steel sheet 1 is molded into a battery container, there occurs an increase of the dissolution amount probably caused by the increase of the exposure of iron. The causes for the exposure of iron on the inner surface of the battery container are probably the exposure of a large amount of iron on the inner surface of the battery container and the appearance of local iron exposure portions, not only in the case where the thickness of the nickel layer 14 nearly vanishes and iron reaches the surface layer in the surface-treated steel sheet 1, but also in the case where iron does not reach the surface layer in the state of the surface-treated steel sheet 1. In this case, when the surface-treated steel sheet 1 is stored or used as a battery container over a long term, there is an adverse possibility that iron is dissolved from the local iron exposure portions into the electrolytic solution, and the gas generated due to the dissolution of iron increases the internal pressure of the interior of the battery.

In particular, the present inventors have discovered that the corrosion resistance is liable to be more decreased, in the case where the nickel plating layer is made thin for the purpose of achieving a high battery capacity, or in the case where a processing is performed to make the thickness of the can wall after forming a battery can thinner than the thickness of the surface-treated steel sheet before forming the battery can for the purpose of achieving a high battery capacity, because the processing conditions for the surface-treated steel sheet 1 are more severe as compared with the processing allowing the thickness of the can wall to be approximately the same as the thickness of the surface-treated steel sheet before the formation of the battery can; the present inventors have revealed that the surface-treated steel sheet 1 of the present embodiment exhibits a marked corrosion resistance even under such severe processing conditions. Moreover, for the purpose of achieving a high battery capacity, it is possible to make thin the thickness of the nickel plating layer and to make thin the thickness of the can wall; however, either of these approaches offers a factor to degrade the corrosion resistance of the battery container. The present inventors have found a new problem of the compatibility of these approaches for achieving a high capacity and the corrosion resistance improvement with respect to the conventional surface-treated steel sheets, and have found a new constitution capable of coping with the achievement of a high capacity.

It is to be noted that when the thickness of the iron-nickel diffusion layer 12 is made too thin, the formation of the iron-nickel diffusion layer 12 comes to be insufficient, and as described above, when the surface-treated steel sheet 1 is used as a battery container, the corrosion resistance improvement effect due to the iron-nickel diffusion layer 12 and the improvement effect of the adhesiveness of the nickel layer 14 due to the iron-nickel diffusion layer 12 are not sufficiently obtained. In particular, the present inventors have revealed that in the case where a processing for making thin the thickness of the can wall is applied for the purpose of achieving a high capacity, the corrosion resistance improvement effect is not obtained when the thickness of the iron-nickel diffusion layer is too thin, even in the presence of the thickness of the nickel layer 14 as the upper layer; however, a marked effect is obtained when there is formed an iron-nickel diffusion layer 12 having a thickness of 0.04

μm or more, detectable by the high frequency glow discharge optical emission spectrometric analyzer (GDS).

In the present embodiment, as described above, with respect to the surface-treated steel sheet 1, by setting the thickness of the iron-nickel diffusion layer 12 to be comparatively as thin as 0.04 to 0.31 μm, and by controlling the total amount of the nickel contained in the iron-nickel diffusion layer and the nickel contained in the nickel layer so as to fall within a range from 10.8 to 26.7 g/m$^2$, it is possible to provide a surface-treated steel sheet 1 excellent in corrosion resistance even when the volume percentage is improved by making thin the thickness of the can wall when the surface-treated steel sheet 1 is processed into a battery container. It is to be noted that when thickness of the can wall of a battery container is made thin, the amount of iron dissolved on the inner surface of the battery container sometimes has hitherto come to be large, and consequently the corrosion resistance of the inner surface of the battery container is sometimes degraded. On the other hand, as a method for improving the corrosion resistance when formed into a battery container, there is a method to make thick the thickness of the iron-nickel diffusion layer and the thickness of the nickel layer formed on the inner surface of the battery container; however, in this case, there is a problem that the thickness of the can wall comes to be thick when formed into a battery container, and consequently the volume percentage is degraded. Accordingly, in the technique for the surface-treated steel sheet for a battery container, it has been difficult to allow the volume percentage and the corrosion resistance to be compatible with each other when formed into a battery container. In contrast, according to the present embodiment, by controlling the thickness of the iron-nickel diffusion layer 12 and the above-described total amount of the nickel contained in the iron-nickel diffusion layer 12 and the nickel contained in the nickel layer 14 so as to fall within the above-described ranges, respectively, it is possible to provide a surface-treated steel sheet 1 being highly balanced between the volume percentage and the corrosion resistance when formed into a battery container.

In addition, there has hitherto been known a method in which the thickness of the iron-nickel diffusion layer is set to be 0.5 μm or more, in the surface-treated steel sheet having a nickel plating layer and an iron-nickel diffusion layer, for example, from the viewpoint of improving the processability when molded as a battery container, from the viewpoint of improving the corrosion resistance of the battery container, and from the viewpoint of securing the adhesiveness of the iron-nickel diffusion layer (see, for example, the paragraph 0018 in Japanese Patent Laid-Open No. 2009-263727). Herein, in order to set the thickness of the iron-nickel diffusion layer to be 0.5 μm or more, the condition of the thermal diffusion treatment after the formation of the nickel plating layer on the steel sheet is required to be a long time or a high temperature. For example, when the condition of the thermal diffusion treatment is set to be a long time, there have been known the conditions that the heat treatment temperature is set to be 400 to 600° C., and the heat treatment time is set to be 1 to 8 hours. In addition, when the condition of the thermal diffusion treatment is set to be a high temperature, there have been known the conditions that the heat treatment temperature is set to be 700 to 800° C., and the heat treatment time is set to be 30 seconds to 2 minutes. Under such circumstances, the present inventors have obtained a finding that when the thermal diffusion treatment is performed under the above-described condition of a long time or a high temperature, the iron of the steel sheet constituting the surface-treated steel sheet is thermally diffused to an excessive extent, and when the obtained surface-treated steel sheet is molded into a battery container, the amount of iron dissolved is increased; and accordingly, as described above, the present inventors have discovered that gas is generated in the interior of the battery, and the internal pressure of the interior of the battery is liable to be increased due to the generation of the gas. In addition, when the thermal diffusion treatment is performed at a heat treatment temperature of 700 to 800° C. and at a heat treatment time of 30 seconds to 2 minutes, there is a problem that the hardness of the nickel layer 14 is decreased excessively, and consequently the sticking to the mold occurs to a large extent.

In contrast, according to the present embodiment, with respect to the surface-treated steel sheet 1, by setting the thickness of the iron-nickel diffusion layer 12 to be comparatively as thin as 0.04 to 0.31 μm, and by controlling the total amount of the nickel contained in the iron-nickel diffusion layer and the nickel contained in the nickel layer so as to fall within a range from 10.8 to 26.7 g/m$^2$, the exposure area of the iron of the steel sheet is reduced on the inner surface side when the steel sheet surface-treated steel sheet 1 is molded into a battery container, it is made possible to improve the corrosion resistance when the surface-treated steel sheet 1 is used as a battery container, and in addition, it is made possible to more improve the processability when the surface-treated steel sheet 1 is processed into a battery container.

Such effects as described above are particularly exhibited when there is performed a processing (such as a processing including ironing) in which the thickness is reduced by 10% or more in relation to the original sheet thickness (the thickness of the surface-treated steel sheet 1).

In addition, in the present embodiment, the thickness of the nickel layer 14 is preferably 1.0 μm or more, more preferably 1.3 μm or more, further preferably 1.5 μm or more, and particularly preferably 1.8 μm or more. In addition, the upper limit of the thickness of the nickel layer 14 is not particularly limited, but is preferably 3.0 μm or less, more preferably 2.9 μm or less, and further preferably 2.5 μm or less.

Moreover, in the present embodiment, the ratio of the thickness of the iron-nickel diffusion layer 12 to the thickness of the nickel layer 14 (thickness of iron-nickel diffusion layer 12/thickness of nickel layer 14) is preferably 0.013 to 0.5, more preferably 0.02 to 0.25, further preferably 0.03 to 0.2, and particularly preferably 0.04 to 0.16. By controlling the ratio of (thickness of iron-nickel diffusion layer 12/thickness of nickel layer 14) so as to fall within the above-described range, namely, by controlling the thickness of the nickel layer 14 so as to be comparatively thicker in relation to the thickness of the iron-nickel diffusion layer 12, when the surface-treated steel sheet 1 is used as a battery container, the corrosion resistance of the battery container can be further improved. In other words, as described above, with respect to the surface-treated steel sheet 1 after the heat treatment, sometimes iron is exposed to the inner surface of the battery container, and local iron exposure portions appear. In contrast, in the present embodiment, by controlling the ratio of (thickness of iron-nickel diffusion layer 12/thickness of nickel layer 14) so as to fall within the above-described range in such a way that the thickness of the nickel layer 14 is comparatively thicker in relation to the thickness of the iron-nickel diffusion layer 12, when the surface-treated steel sheet 1 is mold-processed, by using, for example, a deep drawing processing method, a drawing and ironing processing method (DI processing method), a drawing thin and redrawing processing method (DTR processing method), or a processing method using a stretch processing and an ironing processing in combination after a drawing processing, the nickel layer 14 being the outermost layer of the surface-treated steel sheet 1 is extended due to the stress of the mold processing, nickel covers the iron exposed to the surface of the surface-treated steel sheet 1, and consequently the corrosion resistance of the obtained battery container can be further improved.

In particular, in the present embodiment, by controlling the thickness of the nickel layer 14 so as to fall within the above-described comparatively thick range of 1.0 μm or more, when the surface-treated steel sheet 1 is mold-processed into a battery container, the nickel of the nickel layer 14 better covers the iron exposed to the surface of the surface-treated steel sheet 1, and the corrosion resistance of the obtained battery container is more improved.

The thickness of the nickel layer 14 after the thermal diffusion treatment can be determined by detecting the boundary between the nickel layer 14 and the iron-nickel diffusion layer 12, on the basis of the measurement using the above-described high frequency glow discharge optical emission spectrometric analyzer. In other words, the time at which the measurement of the surface of the surface-treated steel sheet 1 is started by using the high frequency glow discharge optical emission spectrometric analyzer is taken as the starting point, the measurement time until the time giving the Fe intensity of 10% of the saturated value of the Fe intensity is calculated, and an the basis of the calculated measurement time, the thickness of the nickel layer 14 can be determined. In the present embodiment, the thickness of the iron-nickel diffusion layer 12 and the thickness of the nickel layer 14 are measured with the high frequency glow discharge optical emission spectrometric analyzer, and by using the obtained measurement results, the ratio of (thickness of iron-nickel diffusion layer 12/thickness of nickel layer 14) can be determined.

In addition, in the present embodiment, in the nickel layer 14 after the thermal diffusion treatment, the average crystal grain size in the surface portion thereof is preferably 0.2 to 0.6 μm, more preferably 0.3 to 0.6 μm, and further preferably 0.3 to 0.5 μm. In the present embodiment, the average crystal grain size in the surface portion of the nickel layer 14 is not particularly limited; when the average crystal grain size is too small, the plating stress remains accumulated, and in this case, when mold-processed as a battery container, a deep crack reaching the steel sheet occurs in the surface-treated steel sheet 1, and thus, the iron of the steel sheet 11 is sometimes exposed. In this case, iron is dissolved from the exposed portion of the steel sheet 11, and there is an adverse possibility that the gas generated along with the dissolution of iron increases the internal pressure of the interior of the battery. On the other hand, as described above, failures occur when the cracks reaching the steel sheet 11 are generated in the surface-treated steel sheet 1; however, from the viewpoint of improving the battery properties of the battery container, it is preferable for fine cracks to occur on the inner surface side of the battery container formed of the surface-treated steel sheet 1. In this regard, when the average crystal grain size in the surface portion of the nickel layer 14 is too large, the hardness of the nickel layer 14 sometimes comes to be too low (the nickel layer 14 is softened excessively); in this case, when the surface-treated steel sheet 1 is mold-processed as a battery container, fine cracks cannot be generated on the inner surface of the battery container, and accordingly, there is an adverse possibility that the following effect is not sufficiently obtained: the effect of improving the battery properties, namely, the effect of improving the battery properties by increasing the contact area between the battery container and the positive electrode mixture owing to the cracks and thereby decreasing the internal resistance of the battery.

It is to be noted that the average crystal grain size in the surface portion of the nickel layer 14 tends to be larger with the increase of the heat treatment temperature in the thermal diffusion treatment, and the present inventors have discovered that the magnitude of the average crystal grain size increases in a stepwise manner depending on the temperature range. The crystal grains are larger in the case where heat treatment is applied even at a low temperature such as 300° C., as compared with the case where no heat treatment is applied. When the heat treatment temperature is set to be between 400 and 600° C., the crystal grain size increases with the increase of the temperature, but the difference of the magnitude of the crystal grain size due to the temperature is moderate. When the heat treatment temperature exceeds 700° C., the average crystal grain size steeply increases. Accordingly, by controlling the heat treatment temperature of the thermal diffusion treatment, it is possible to regulate the average crystal grain size in the surface portion of the nickel layer 14. In particular, by suppressing the coarsening of the average crystal grain size and allowing the surface hardness of the nickel layer 14 to be hard, it is made possible to aim at the improvement of the battery properties and the suppression effect of the sticking of the nickel layer 14 to the mold during the processing into the battery container, and accordingly the heat treatment temperature is particularly preferably 450 to 550° C. In other words, by allowing the surface hardness of the nickel layer 14 to be hard by setting the heat treatment temperature so as to fall within the above described range, it is made possible to generate fine cracks not reaching the steel sheet 11, on the inner surface of the battery container made of the surface-treated steel sheet 1 when the surface-treated steel sheet 1 is mold-processed into a battery container, the cracks increases the contact area between the battery container and the positive electrode mixture and decreases the internal resistance of the battery, and thus the battery properties can be further improved.

In the present embodiment, the average crystal grain size in the surface portion of the nickel layer 14 can be determined, for example, by using the backscattered electron image obtained by measuring the surface of the surface-treated steel sheet 1 with a scanning electron microscope (SEM).

Figure 6:
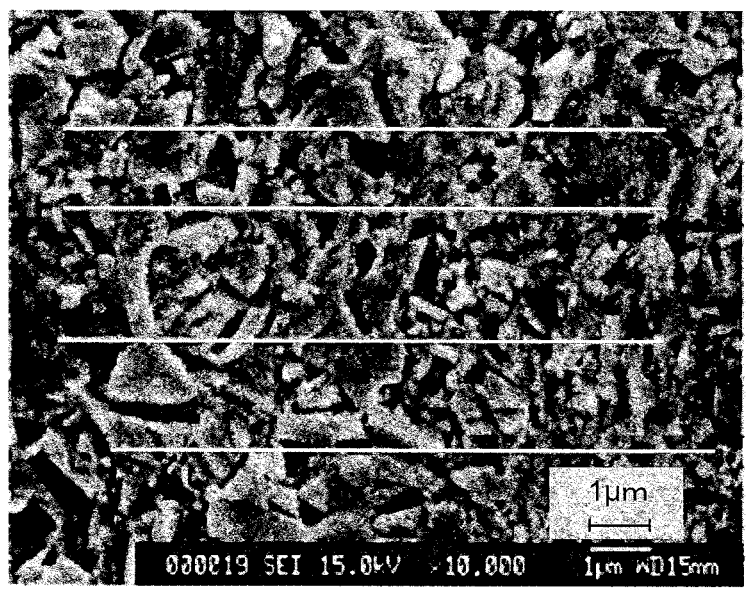
FIG. 6 presents a photograph for illustrating the method for measuring the average crystal grain size in the surface portion of a nickel layer.

Specifically, first, the surface of the surface-treated steel sheet 1 is etched if necessary, then the surface of the surface-treated steel sheet 1 is measured with a scanning electron microscope (SEM), as shown in FIG. 6. It is to be noted that FIG. 6 is an example of the image showing the backscattered electron image obtained by measuring the actually prepared surface-treated steel sheet 1 at a magnification of 10,000. Then, on the obtained backscattered electron image, an optional number of straight line segments of 10 μm in length are drawn (four lines, for example). Then, in each of the line segments, on the basis of the number n of the crystal grains located on the straight line segment, the crystal grain size d is determined by using the formula $d=10/(n+1)$, and the average value of the crystal grain sizes d obtained for the respective straight line segments can be taken as the average crystal grain size in the surface portion of the nickel plating layer 13.

In addition, in the present embodiment, the surface hardness of the nickel layer 14 after the thermal diffusion treatment is a Vickers hardness (HV) measured with a load of 10 gf, and the lower limit of the Vickers hardness is preferably 220 or more, and more preferably 230 or more. The upper limit of the Vickers hardness is preferably 280 or less, more preferably 260 or less, and further preferably 250 or less. By setting the surface hardness of the nickel layer 14 after the thermal diffusion treatment so as to fall within the above-described range, the processability is improved when the obtained surface-treated steel sheet 1 is processed into a battery container, and the corrosion resistance is improved when the surface-treated steel sheet 1 is used for the battery container. In addition, it is possible to more enhance the suppression effect of the sticking to the mold when the surface-treated steel sheet 1 is mold processed into a battery container.

In the present embodiment, with respect to the surface-treated steel sheet 1, as a method for controlling the thickness of the iron-nickel diffusion layer 12 and the total amount of the nickel contained are controlled in the iron-nickel diffusion layer and the nickel contained in the nickel layer so as to fall within the above-described ranges, respectively, a method for performing the thermal diffusion treatment under the above-described conditions may be mentioned. Specifically, there may be mentioned a method in which after the nickel plating layer 13 is formed on the steel sheet 11, a thermal diffusion treatment is performed under the conditions that the heat treatment temperature is 450 to 600° C., and the heat treatment time is 30 seconds to 2 minutes.

In addition, in the present embodiment, with respect to the obtained surface-treated steel sheet 1, also as the method for controlling the average crystal grain size in the surface portion of the nickel layer 14 so as to fall within the above-described range, a method of performing a thermal diffusion treatment under the same conditions as described above may be mentioned. Specifically, there may be mentioned a method in which after the nickel plating layer 13 is formed on the steel sheet 11, a thermal diffusion treatment is performed under the conditions that the heat treatment temperature is 450 to 600° C., and the heat treatment time is 30 seconds to 2 minutes.

It is to be noted that the thickness of the iron-nickel diffusion layer 12 tends to be thick, with the increase of the heat treatment temperature, and with the increase of the heat treatment time. Accordingly, by controlling the heat treatment temperature and the heat treatment time of the thermal diffusion treatment, it is possible to regulate the thickness of the iron-nickel diffusion layer 12 and the ratio of (thickness of iron-nickel diffusion layer 12/thickness of nickel layer 14). However, because at a heat treatment temperature of 300° C. or lower, it is difficult to form the iron-nickel diffusion layer, it is preferable to perform the thermal diffusion treatment at 480° C. or higher from the viewpoint of controlling the thickness of the iron-nickel diffusion layer 12 and the ratio of (thickness of iron-nickel diffusion layer 12/thickness of nickel layer 14) so as to fall within the above-described ranges.

The surface-treated steel sheet 1 of the present embodiment is constituted as described above.

The surface-treated steel sheet 1 of the present embodiment is used as mold-processed into the positive electrode can 21 of an alkaline battery 2 shown in FIGS. 1 and 2, battery containers of other batteries and the like, by using, for example, a deep drawing processing method, a drawing and ironing processing method (DI processing method), a drawing thin and redrawing processing method (DTR processing method), or a processing method using a stretch processing and an ironing processing in combination after a drawing processing.

<Method for Producing Surface-Treated Steel Sheet 1>

Next, a method for producing the surface-treated steel sheet 1 of the present embodiment is described.

First, the steel sheet 11 is prepared, and as described above, a nickel plating is applied to the steel sheet 11, to form the nickel plating layer 13 on the surface of the steel sheet 11, to be the inner surface of a battery container. It is to be noted that the nickel plating layer 13 is preferably formed not only on the surface of the steel sheet 11 to be the inner surface of the battery container but also on the opposite surface. When the nickel plating layer 13 is formed on both surfaces of the steel sheet 11, the nickel plating layers 13 different from each other in the composition and the surface roughness may be formed on the surface in the steel sheet 11 to be the inner surface of the battery container and on the surface of the steel sheet 11 to be the outer surface of the battery container, respectively, by using plating baths having different compositions; however, from the viewpoint of improving the production efficiency, it is preferable to form the nickel plating layers 13 on both surfaces of the steel sheet 11, by using the same plating bath in one step.

Next, by performing the thermal diffusion treatment under the above-described conditions for the steel sheet 11 having the nickel plating layer 13 formed thereon, the iron constituting the steel sheet 11 and the nickel constituting the nickel plating layer 13 are allowed to thermally diffuse, to from the iron-nickel diffusion layer 12 and the nickel layer 14. Herewith, the surface-treated steel sheet 1 as shown in FIG. 3 is obtained.

It is to be noted that in the present embodiment, a temper rolling may be applied to the obtained surface-treated steel sheet 1. Herewith, it is possible to regulate the surface roughness of the surface of the surface-treated steel sheet 1 to be the inner surface of the battery container; when the surface-treated steel sheet 1 is used as a battery container, the contact area between the battery container and the positive electrode mixture can be increased, the internal resistance of the battery can be decreased, and the battery properties can be improved.

As described above, the surface-treated steel sheet 1 of the present embodiment is produced.

In the surface-treated steel sheet 1 of the present embodiment, as described above, by setting the thickness of the iron-nickel diffusion layer 12 to be comparatively as thin as 0.04 to 0.31 μm, and by controlling the total amount of the nickel contained in the iron-nickel diffusion layer and the nickel contained in the nickel layer so as to fall within a range from 10.8 to 26.7 g/m², it is possible to effectively prevent the generation of gas even when the alkaline battery 2 prepared by using the surface-treated steel sheet 1 is used or stored over a long term, and herewith it is possible to prevent the increase of the internal pressure of the interior of the battery due to the generation of gas. Moreover, as described above, by setting the thickness of the nickel layer 14 to be preferably 1.0 μm or more, the corrosion resistance is more improved when the surface-treated steel sheet 1 is used for the battery container, and it is possible to more effectively prevent the gas generation in such an interior of a battery and the increase of the internal pressure due to the gas generation. Accordingly, the surface-treated steel sheet 1 of the present embodiment can be suitably used as the battery containers of the batteries such as alkaline batteries, the batteries using alkaline electrolytic solutions such as nickel-hydrogen batteries, and lithium-ion batteries.

EXAMPLES

Hereinafter, the present invention is described more specifically with reference to Examples, but the present invention is not limited to these Examples.

Example 1

As a base sheet, there was prepared a steel sheet 11 obtained by annealing a cold rolled sheet (thickness: 0.25 am) of a low-carbon aluminum-killed steel having the chemical composition shown below:

C: 0.045% by weight, Mn: 0.23% by weight, Si: 0.02% by weight, P: 0.012% by weight, S: 0.009% by weight, Al: 0.063% by weight, N: 0.0036% by weight, the balance: Fe and inevitable impurities.

Then, the prepared steel sheet 11 was subjected to alkaline electrolytic degreasing and sulfuric acid immersion pickling, then subjected to electrolytic plating under the below-described conditions, and thus a nickel plating layer 3 was formed on the steel sheet 11 so as to have a plating deposition amount of 17.8 g/m$^2$. Subsequently, as for the thickness of the nickel plating layer 13, the deposition amount thereof was determined by performing a fluorescent X-ray measurement. The results thus obtained are shown in Table 1.

Bath composition: nickel sulfate: 250 g/L, nickel chloride: 45 g/L, boric acid: 45 g/L
pH: 3.5 to 4.5
Bath temperature: 60° C.
Electric current density: 20 A/dm$^2$
Energizing time: 32 seconds Next, the steel sheet 11 having the nickel plating layer 13 formed thereon was subjected to a thermal diffusion treatment by continuous annealing under the conditions of a heat treatment temperature of 480° C., a heat treatment time of 30 seconds, and a reductive atmosphere, and thus an iron-nickel diffusion layer 12 and a nickel layer 14 were formed, to obtain a surface-treated steel sheet 1.

Next, the obtained surface-treated steel sheet 1 was subjected to a temper rolling under the condition of an extension percentage of 1%.

Then, by using the surface-treated steel sheet 1 after the temper rolling, according to the below-described methods, the measurement of the thickness of the iron-nickel diffusion layer 12 and the thickness of the nickel layer 14 was performed.

<Measurement of Thickness of Iron-Nickel Diffusion Layer 12 and Thickness of Nickel Layer 14>

With respect to the surface-treated steel sheet 1, by using a high frequency glow discharge optical emission spectrometric analyzer, the variations of the Fe intensity and the Ni intensity were continuously measured in the depth direction from the outermost layer toward the steel sheet 11, the time giving the Fe intensity of 10% of the saturated value of the Fe intensity is taken as the starting point, the measurement time until the time giving the Ni intensity an intensity of 10% of the maximum value of the Ni intensity after the Ni intensity had exhibited the maximum value thereof was calculated, and on the basis of the calculated measurement time, the thickness of the iron-nickel diffusion layer 12 was determined. It is to be noted that when the thickness of the iron-nickel diffusion layer 12 was determined, the thickness of the iron-nickel diffusion layer 12 was measured, first, on the basis of the results obtained by performing the high frequency glow discharge optical emission spectrometric analysis of the below-described nickel-plated steel sheet (Comparative Example 2) undergoing no thermal diffusion treatment, the measurements were performed by taking as the reference thickness the thickness measured as the iron-nickel diffusion layer (the value obtained by converting the measurement time into the thickness as follows: the time giving the Fe intensity 10% of the saturated value of the Fe intensity was taken as the starting point, the measurement time until the time giving the Ni intensity 10% of the maximum value after the Ni intensity had exhibited the maximum value thereof was converted into the thickness). It is to be noted that the reference thickness was 0.17 µm. In addition, the thickness of the actual iron-nickel diffusion layer 12 in Example 1 was determined by subtracting the reference thickness from the thickness of the iron-nickel diffusion layer 12 portion (the value obtained by converting the measurement time into the thickness as follows: the time giving the Fe intensity 10% of the saturated value of the Fe intensity was taken as the starting point, and the measurement time until the time giving the Ni intensity 10% of the maximum value after the Ni intensity had exhibited the maximum value thereof was converted into the thickness) of the surface-treated steel sheet 1 of Example 1. In addition, for the nickel layer 14, by taking as the starting point the time at which the measurement of the surface of the surface-treated steel sheet 1 was started with the high frequency glow discharge optical emission spectrometric analyzer, the measurement time until the Fe intensity was given an intensity of 10% of the saturated value of the Fe intensity was calculated, and on the basis of the calculated measurement time, the thickness of the nickel layer 14 was determined. Then, on the basis of the measurement result, the ratio of the thickness of the iron-nickel diffusion layer 12 to the thickness of the nickel layer 14 (thickness of iron-nickel diffusion layer 12/thickness of nickel layer 14) was determined. The results thus obtained are shown in Table 1. It is to be noted that, in Table 1, the ratio of (thickness of iron-nickel diffusion layer 12/thickness of nickel layer 14) was described as "Thickness ratio Fe—Ni/Ni."

It is to be noted that in the measurement with a high frequency glow discharge optical emission spectrometric analyzer, with the increase of the thickness of the nickel plating layer, the reference thickness calculated from the measurement of the nickel plating layer comes to be increased; thus, when the thickness of the iron-nickel diffusion layer is determined, the reference thickness is checked in the plating deposition amount of each of the layers, or alternatively, it is desirable that the measurement of the reference thickness is performed in each of the two or more samples, different from each other in the plating deposition amount before performing heat treatment, the relation formula between the plating deposition amount and the reference thickness is determined, and then the thickness of the iron-nickel diffusion layer is calculated

Examples 3 to 6, 8 to 11, and 13 to 19 and Reference Examples 2 to 4

In each of Examples 3 to 6, 8 to 11, and 13 to 19 and Reference Examples 2 to 4, a surface-treated steel sheet 1 was obtained in the same manner as in Example 1 except that the plating deposition amount of the nickel plating layer 13, and the continuous annealing conditions (heat treatment conditions) for the steel sheet 11 having a nickel plating 13 formed thereon were altered as shown in Table 1, and the measurements were performed in the same manner. The results thus obtained are shown in Table 1. It is to be noted that in Examples 3 and 6 and Reference Examples 2 to 4, the reference thickness used in the calculation of the thickness of the iron-nickel diffusion layer was calculated by deriving the relation formula between the plating deposition amount and the reference thickness from the reference thickness values calculated from below-described Comparative Example 1 and Comparative Example 2.

Comparative Example 1

A nickel-plated steel sheet was prepared under the same conditions as in Example 1 except that the plating deposition amount of the nickel plating layer 13 was altered from 17.8 g/m$^2$ to 8.0 g/m$^2$, and neither a continuous annealing nor a temper rolling was performed after the nickel plating layer 13 was formed. In the prepared nickel-plated steel sheet, the thickness of the nickel plating layer 13 was determined as the thickness of the nickel layer 14. The results thus obtained are shown in Table 1.

Comparative Example 2

A nickel-plated steel sheet was prepared under the same conditions as in Example 1 except that neither a continuous annealing nor a temper rolling was performed after the nickel plating layer 13 was formed. In the prepared nickel-plated steel sheet, the thickness of the nickel plating layer 13 was determined as the thickness of the nickel layer 14. The results thus obtained are shown in Table 1.

Comparative Examples 3 to 10

In each of Comparative Examples 3 to 10, a surface-treated steel sheet 1 was obtained in the same manner as in Example 1 except that the plating deposition amount of the nickel plating layer 13, and the continuous annealing conditions (heat treatment conditions) for the steel sheet 11 having a nickel plating layer 13 formed thereon were altered as shown in Table 1, and the measurements were performed in the same manner. The results thus obtained are shown in Table 1. It is to be noted that in Comparative Example 3, the thickness of the iron-nickel diffusion layer 12 was equal to or smaller than the detection limit value (0.04 μm) of the high frequency glow discharge optical emission spectrometric analyzer, and accordingly the thickness of the iron-nickel diffusion layer 12 was regarded to be more than 0 μm and less than 0.04 μm, and the "thickness ratio Fe—Ni/Ni" was taken to be "0<".

Reference Example 1

A nickel-plated steel sheet was prepared under the same conditions as in Example 1 except that the plating deposition amount of the nickel plating layer 13 was altered from 18.2 g/m$^2$ to 10.6 g/m$^2$, and neither a continuous annealing nor a temper rolling was performed after the nickel plating layer 13 was formed. Then, the prepared nickel-plated steel sheet was subjected to measurements, as described above, on the basis of the high frequency glow discharge optical emission spectrometric analysis to obtain the measurement results shown in FIG. 5(B), and the measurements were performed by taking as the reference thickness the thickness measured as the iron-nickel diffusion layer (the value obtained by converting the measurement time into the thickness as follows: in FIG. 5(B), the time giving the Fe intensity 10% of the saturated value of the Fe intensity was taken as the starting point, the measurement time until the time giving the Ni intensity 10% of the maximum value after the Ni intensity had exhibited the maximum value thereof was converted into the thickness). The results thus obtained are shown in Table 1 and FIG. 5(B).

Example 20

The prepared steel sheet 11 was subjected to alkaline electrolytic degreasing and sulfuric acid immersion pickling, and then subjected to electrolytic plating under the below-described conditions, in a plating bath prepared by adding, to the below-described base composition bath, a semi-gloss agent containing 0.16 ml/L of an aliphatic unsaturated alcohol, 0.38 ml/L of an unsaturated carboxylic acid, 0.3 ml/L of formaldehyde and 0.064 ml/L of methanol; thus a nickel plating layer 13 was formed an the steel sheet 11 so as to have a plating deposition amount of 17.8 g/m$^2$. Subsequently, as for the thickness of the nickel plating layer 13, the deposition amount thereof was determined by performing a fluorescent X-ray measurement.

Bath composition: Nickel sulfate: 250 g/L, nickel chloride: 45 g/L, boric acid: 45 g/L
pH: 3.5 to 4.5
Bath temperature: 60° C.
Electric current density: 20 A/dm$^2$
Energizing time: 32 seconds Next, the steel sheet 11 having the nickel plating layer 13 formed thereon was subjected to a thermal diffusion treatment by continuous annealing under the conditions of a heat treatment temperature of 450° C., a heat treatment time of 30 seconds, and a reductive atmosphere, and thus an iron-nickel diffusion layer 12 and a nickel layer 14 were formed, to obtain a surface-treated steel sheet 1.

Next, the obtained surface-treated steel sheet 1 was subjected to a temper rolling under the condition of an extension percentage of 1%.

Then, the measurement of the thickness of the iron-nickel diffusion layer 12 and the thickness of the nickel layer 14 was performed by using the surface-treated steel sheet 1 after the temper rolling, according to the below-described method.

Examples 21 to 26

In each of Examples 21 to 26, a surface-treated steel sheet 1 was obtained in the same manner as in Example 20 except that the continuous annealing conditions (heat treatment conditions) for the steel sheet 11 having a nickel plating layer 13 formed thereon were altered as shown in Table 1, and the measurements were performed in the same manner. The results thus obtained are shown in Table 1.

Comparative Example 11

The prepared steel sheet 11 was subjected to alkaline electrolytic degreasing and sulfuric acid immersion pickling, and then subjected to electrolytic plating under the below-described conditions, in a plating bath prepared by adding, to the below-described base composition bath, a semi-gloss agent containing 0.16 ml/L of an aliphatic unsaturated alcohol, 0.38 ml/L of an unsaturated carboxylic acid, 0.3 ml/L of formaldehyde and 0.064 ml/L of methanol; thus a nickel plating layer 13 was formed on the steel sheet 11 so as to have a plating deposition amount of 17.8 g/m$^2$. Subsequently, as for the thickness of the nickel plating layer 13, the deposition amount thereof was determined by performing a fluorescent X-ray measurement.

Bath composition: Nickel sulfate: 250 g/L, nickel chloride: 45 g/L, boric acid: 45 g/L pH: 3.5 to 4.5

Bath temperature: 60° C.

Electric current density: 20 A/dm$^2$

Energizing time: 32 seconds

Next, the steel sheet 11 having the nickel plating layer 13 formed thereon was subjected to a thermal diffusion treatment by continuous annealing under the conditions of a heat treatment temperature of 650° C., a heat treatment time of 30 seconds, and a reductive atmosphere, and thus an iron-nickel diffusion layer 12 and a nickel layer 14 were formed, to obtain a surface-treated steel sheet 1.

Next, the obtained surface-treated steel sheet 1 was subjected to a temper rolling under the condition of an extension percentage of 1%.

Then, the measurement of the thickness of the iron-nickel diffusion layer 12 and the thickness of the nickel layer 14 was performed by using the surface-treated steel sheet 1 after the temper rolling, according to the below-described method.

Comparative Example 12

A surface-treated steel sheet 1 was obtained in the same manner as in Example 20 except that the continuous annealing conditions (heat treatment conditions) for the steel sheet 11 having a nickel plating layer 13 formed thereon were altered as shown in Table 1, and the measurements were performed in the same manner. The results thus obtained are shown in Table 1.

Comparative Example 13

A nickel-plated steel sheet was prepared under the same conditions as in Comparative Example 12 except that neither a continuous annealing nor a temper rolling was performed after the nickel plating layer 13 was formed. In the prepared nickel-plated steel sheet, the thickness of the nickel plating layer 13 was determined as the thickness of the nickel layer 14. The results thus obtained are shown in Table 1.

TABLE 1

| | Before heat treatment | Heat treatment conditions | | After heat treatment | | | |
|---|---|---|---|---|---|---|---|
| | Plating amount (g/m$^2$) | Temperature [° C.] | Time | Nickel layer 14 Thickness [μm] | Iron-nickel diffusion layer 12 Thickness [μm] | Thickness ratio Fe—Ni/Ni | Remark |
| Example 1 | 18.2 | 480 | 30 sec | 2.00 | 0.10 | 0.050 | |
| Example 2 | 29.3 | 480 | 30 sec | 3.23 | 0.12 | 0.038 | |
| Example 3 | 12.2 | 500 | 30 sec | 1.32 | 0.11 | 0.083 | |
| Example 4 | 19.2 | 500 | 30 sec | 2.10 | 0.13 | 0.06 | |
| Example 5 | 18.6 | 500 | 30 sec | 2.01 | 0.15 | 0.075 | |
| Example 6 | 23.8 | 500 | 30 sec | 2.63 | 0.09 | 0.034 | |
| Example 7 | 29.1 | 500 | 30 sec | 3.20 | 0.12 | 0.038 | |
| Example 8 | 19.2 | 550 | 30 sec | 2.08 | 0.15 | 0.072 | |
| Example 9 | 17.8 | 580 | 30 sec | 1.89 | 0.21 | 0.111 | |
| Example 10 | 20.0 | 600 | 30 sec | 2.12 | 0.25 | 0.12 | |
| Example 11 | 18.8 | 600 | 30 sec | 1.98 | 0.27 | 0.136 | |
| Example 12 | 30.5 | 600 | 30 sec | 3.33 | 0.19 | 0.056 | |
| Example 13 | 18.2 | 480 | 30 sec | 2.00 | 0.10 | 0.052 | |
| Example 14 | 17.7 | 480 | 60 sec | 1.94 | 0.10 | 0.050 | |
| Example 15 | 17.9 | 500 | 60 sec | 1.92 | 0.18 | 0.093 | |
| Example 16 | 19.2 | 550 | 60 sec | 2.08 | 0.15 | 0.07 | |
| Example 17 | 17.5 | 580 | 30 sec | 1.89 | 0.15 | 0.080 | |
| Example 18 | 17.4 | 580 | 60 sec | 1.86 | 0.18 | 0.096 | |
| Example 19 | 17.9 | 600 | 60 sec | 1.98 | 0.27 | 0.140 | |
| Comparative Example 1 | 9.0 | — | — | 1.00 | none | — | |
| Comparative Example 2 | 18.0 | — | — | 2.00 | none | — | |
| Comparative Example 3 | 18.1 | 350 | 30 sec | 2.01 | More than 0 μm, less than 0.04 μm | 0< | |
| Comparative Example 4 | 9.7 | 500 | 60 min | 0.91 | 0.35 | 0.39 | |
| Comparative Example 5 | 17.2 | 500 | 60 min | 1.77 | 0.33 | 0.186 | |
| Comparative Example 6 | 9.9 | 700 | 30 sec | 0.89 | 0.44 | 0.494 | |
| Comparative Example 7 | 18.6 | 700 | 30 sec | 1.87 | 0.45 | 0.241 | |
| Comparative Example 8 | 18.0 | 400 | 60 sec | 2.06 | More than 0 μm, less than 0.04 μm | 0< | |
| Comparative Example 9 | 19.1 | 450 | 360 min | 1.62 | 1.05 | 0.651 | |
| Comparative Example 10 | 19.5 | 500 | 360 min | 1.65 | 1.08 | 0.658 | |
| Reference Example 1 | 10.6 | — | — | Reference thickness | Reference thickness | — | |
| Example 20 | 18.0 | 450 | 30 sec | 1.74 | 0.22 | 0.127 | Semi-gloss |
| Example 21 | 18.2 | 480 | 30 sec | 1.76 | 0.23 | 0.133 | Semi-gloss |
| Example 22 | 17.7 | 500 | 30 sec | 1.70 | 0.23 | 0.138 | Semi-gloss |

TABLE 1-continued

|  | Before heat treatment | Heat treatment conditions | | After heat treatment | | | |
|---|---|---|---|---|---|---|---|
|  | Plating amount (g/m²) | Temperature [° C.] | Time | Nickel layer 14 Thickness [μm] | Iron-nickel diffusion layer 12 Thickness [μm] | Thickness ratio Fe—Ni/Ni | Remark |
| Example 23 | 18.1 | 500 | 60 sec | 1.73 | 0.26 | 0.15 | Semi-gloss |
| Example 24 | 17.8 | 550 | 30 sec | 1.70 | 0.26 | 0.153 | Semi-gloss |
| Example 25 | 18.4 | 550 | 60 sec | 1.76 | 0.27 | 0.152 | Semi-gloss |
| Example 26 | 18.5 | 580 | 30 sec | 1.76 | 0.31 | 0.173 | Semi-gloss |
| Comparative Example 11 | 17.9 | 650 | 30 sec | 1.68 | 0.33 | 0.197 | Semi-gloss |
| Comparative Example 12 | 18.8 | 700 | 30 sec | 1.74 | 0.41 | 0.235 | Semi-gloss |
| Comparative Example 13 | 18.0 | — | — |  |  | — | Semi-gloss |

Next, the surface-treated steel sheets 1 of Examples 3, 5, 6, 8, 11, 13 to 19 and 22 and Comparative Examples 4 to 10, and the nickel-plated steel sheet of Comparative Examples 1 and 2 were evaluated according to the below-described method, with respect to the corrosion resistance when each of these steel sheets was molded into a battery container.

<Evaluation of Corrosion Resistance>

A blank was prepared by punching out a surface-treated steel sheet 1 into a predetermined shape with a press machine, the obtained blank was subjected to a drawing and ironing processing in such a way that the nickel layer 14 was on the inner surface side, and thus a battery container was prepared (it is to be noted that when a nickel-plated steel sheet was used, a battery container was prepared in such a way that the nickel plating layer 13 was on the inner surface side). Specifically, a tubular body was obtained by applying a drawing and ironing processing to the blank by using a drawing and ironing machine including drawing dies or ironing dies, each having a predetermined clearance, arranged in six stages and a punch, and a battery container was obtained by cutting the lug part in the vicinity of the opening of the obtained tubular body. The drawing and ironing processing used the dies in each of which the clearance was set in such a way that the thickness of the can bottom at a position of 10 mm from the can bottom after processing was 0.15 mm.

Next, the obtained battery container was evaluated with respect to the amount of Fe ions dissolved as follows: the obtained battery container was filled with a 10 mol/L potassium hydroxide solution, sealed and stored under the conditions of 60° C., 480 hours, then the amount of Fe ions dissolved from the inner surface of the battery container into the solution was measured with a high frequency inductively coupled plasma emission spectrometric analyzer (ICP) (ICPE-9000, manufactured by Shimadzu Corp.), and the amount of Fe ions dissolved was evaluated on the basis of the following standards. When the evaluation was A+, A, B or C in the following standards, the dissolution of iron from the inner surface of the battery container was determined to be sufficiently suppressed. The results thus obtained are shown in Table 2.

A+: The amount of Fe ions dissolved was less than 30 mg/L.

A: The amount of Fe ions dissolved was 30 mg/L or more and less than 33 mg/L.

B: The amount of Fe ions dissolved was 33 mg/L or more and less than 36 mg/L.

C: The amount of Fe ions dissolved was 36 mg/L or more and less than 37 mg/L.

D: The amount of Fe ions dissolved was 38 mg/L or more.

D−: The amount of Fe ions dissolved was 40 mg/L or more.

TABLE 2

|  | Before heat treatment | Heat treatment conditions | | After heat treatment | | | | |
|---|---|---|---|---|---|---|---|---|
|  | Plating amount (g/m²) | Temperature [° C.] | Time | Nickel layer 14 Thickness [μm] | Iron-nickel diffusion layer 12 Thickness [μm] | Thickness ratio Fe—Ni/Ni | Corrosion resistance | Remark |
| Example 3 | 12.2 | 500 | 30 sec | 1.32 | 0.11 | 0.083 | A |  |
| Example 5 | 18.6 | 500 | 30 sec | 2.01 | 0.15 | 0.075 | A+ |  |
| Example 6 | 23.8 | 500 | 30 sec | 2.63 | 0.09 | 0.034 | A+ |  |
| Example 8 | 19.2 | 550 | 30 sec | 2.08 | 0.15 | 0.072 | A+ |  |
| Example 11 | 18.8 | 600 | 30 sec | 1.98 | 0.27 | 0.136 | A |  |
| Example 13 | 18.2 | 480 | 30 sec | 2.00 | 0.10 | 0.052 | A |  |
| Example 14 | 17.7 | 480 | 60 sec | 1.94 | 0.10 | 0.050 | A |  |
| Example 15 | 17.9 | 500 | 60 sec | 1.92 | 0.18 | 0.093 | A+ |  |
| Example 16 | 19.2 | 550 | 60 sec | 2.08 | 0.15 | 0.07 | A |  |
| Example 17 | 17.5 | 580 | 30 sec | 1.89 | 0.15 | 0.080 | B |  |
| Example 18 | 17.4 | 580 | 60 sec | 1,86 | 0.18 | 0.096 | B |  |
| Example 19 | 17.9 | 600 | 60 sec | 1.98 | 0.27 | 0.140 | C |  |
| Example 22 | 17.7 | 500 | 30 sec | 1.70 | 0.23 | 0.138 | A+ | Semi-gloss |

TABLE 2-continued

|  | Before heat treatment | Heat treatment conditions | | After heat treatment | | | | |
|---|---|---|---|---|---|---|---|---|
|  | Plating amount (g/m²) | Temperature [° C.] | Time | Nickel layer 14 Thickness [μm] | Iron-nickel diffusion layer 12 Thickness [μm] | Thickness ratio Fe—Ni/Ni | Corrosion resistance | Remark |
| Comparative Example 1 | 9.0 | — | — | 1.00 | none | — | D– |  |
| Comparative Example 2 | 18.0 | — | — | 2.00 | none | — | D– |  |
| Comparative Example 4 | 9.7 | 500 | 60 min | 0.91 | 0.35 | 0.39 | D– |  |
| Comparative Example 5 | 17.2 | 500 | 60 min | 1.77 | 0.33 | 0.186 | D |  |
| Comparative Example 6 | 9.9 | 700 | 30 sec | 0.89 | 0.44 | 0.494 | D |  |
| Comparative Example 7 | 18.6 | 700 | 30 sec | 1.87 | 0.45 | 0.241 | D |  |
| Comparative Example 8 | 18.0 | 400 | 60 sec | 2.06 | 0 | 0 | D |  |
| Comparative Example 9 | 19.1 | 450 | 360 min | 1.62 | 1.05 | 0.651 | D– |  |
| Comparative Example 10 | 19.5 | 500 | 360 min | 1.65 | 1.08 | 0.658 | D– |  |

As shown in Table 2, Examples 3, 5, 6, 8, 11, 13 to 19, and 22 in each of which the thickness of the iron-nickel diffusion layer 12 was 0.04 to 0.31 Nm, and the total amount of the nickel contained in the iron-nickel diffusion layer and the nickel contained in the nickel layer was 10.8 to 26.7 g/m² (the thickness of the nickel plating layer 13 was 1.21 to 3.0 μm) gave the results that these Examples were all excellent in corrosion resistance.

On the other hand, as shown in Table 2, Comparative Examples 1 and 2 free from the application of a thermal diffusion treatment gave the results that these Comparative Examples were poor in corrosion resistance; moreover, it is conceivable that the iron-nickel diffusion layer 12 was not formed due to the omission of the thermal diffusion treatment, and accordingly these Comparative Examples were poor in the adhesiveness between the steel sheet 11 and the nickel plating layer 13.

In addition, even in the case where the thermal diffusion treatment was performed, when the total amount of the nickel contained in the iron-nickel diffusion layer and the nickel contained in the nickel layer was too small (the thickness of the nickel plating layer 13 was too thin), the improvement effect of the corrosion resistance due to nickel was insufficient, and the result that the corrosion resistance was poor was obtained as in Comparative Examples 4 and 6. Also, in the case where the thickness of the iron-nickel diffusion layer 12 was too thin, the result that the corrosion resistance was poor was obtained as in Comparative Example 8.

Moreover, even in the case where the thermal diffusion treatment was performed, when the thickness of the iron-nickel diffusion layer 12 was made too thick due to an excessive thermal diffusion treatment, iron was probably exposed to the surface of the nickel layer 14, and the result that the corrosion resistance was poor was obtained as in Comparative Examples 4 to 7, 9, and 10.

Next, there was performed a measurement of the surface hardness of each of the surface-treated steel sheets 1 of Examples 1, 5, 8, 9, 11, 20, and 22, Reference Example 4, and Comparative Examples 6 and 7, and the nickel-plated steel sheets of Comparative Examples 1, 2, and 13, according to the below-described method.

<Measurement of Surface Hardness>

For the nickel layer 14 of the surface-treated steel sheet 1 (or the nickel plating layer 13 of the nickel-plated steel sheet), the surface hardness measurement was performed by measuring the Vickers hardness (HV) with a micro hardness tester (model: MVK-G2, manufactured by Akashi Seisakusho Co., Ltd.), by using a diamond indenter, under the conditions of a load of 10 gf and a holding time of 10 seconds, and the result obtained was evaluated on the basis of the following standards. When the evaluation was A or B in the following standards, it was determined that the hardness was within an appropriate range, the processability when the surface-treated steel sheet 1 was processed into a battery container (the capability of generating fine cracks to an appropriate extent on the inner surface of the battery container when mold-processed into a battery container) and the suppression effect of the sticking to the mold were excellent, and additionally, the corrosion resistance when used for the battery container was excellent. The results obtained are shown in Table 3.

A: 230 or more and less than 280

B: 220 or more and less than 230

C: 280 or more

D: less than 220.

TABLE 3

| | Before heat treatment | Heat treatment conditions | | After heat treatment | | | Surface hardness | | |
|---|---|---|---|---|---|---|---|---|---|
| | Plating amount (g/m²) | Temperature [° C.] | Time | Nickel layer 14 Thickness [μm] | Iron-nickel diffusion layer 12 Thickness [μm] | Thickness ratio Fe—Ni/Ni | Vickers hardness (HV) | Evaluation | Remark |
| Example 1 | 18.2 | 480 | 30 sec | 2.00 | 0.10 | 0.050 | 248 | A | |
| Example 5 | 18.6 | 500 | 30 sec | 2.01 | 0.15 | 0.075 | 241 | A | |
| Example 8 | 19.2 | 550 | 30 sec | 2.08 | 0.15 | 0.072 | 231 | A | |
| Example 9 | 17.8 | 580 | 30 sec | 1.89 | 0.21 | 0.111 | 224 | B | |
| Example 11 | 18.8 | 600 | 30 sec | 1.98 | 0.27 | 0.136 | 220 | B | |
| Example 12 | 30.5 | 600 | 30 sec | 3.33 | 0.19 | 0.056 | 220 | B | |
| Example 20 | 18.0 | 450 | 30 sec | 1.74 | 0.22 | 0.127 | 270 | A | Semi-gloss |
| Example 22 | 17.7 | 500 | 30 sec | 1.70 | 0.23 | 0.138 | 245 | A | Semi-gloss |
| Comparative Example 1 | 9.0 | — | — | 1.00 | none | — | 289 | C | |
| Comparative Example 2 | 18.0 | — | — | 2.00 | none | — | 315 | C | |
| Comparative Example 6 | 9.9 | 700 | 30 sec | 0.89 | 0.44 | 0.494 | 209 | D | |
| Comparative Example 7 | 18.6 | 700 | 30 sec | 1.87 | 0.45 | 0.241 | 217 | D | |
| Comparative Example 13 | 18.0 | — | — | | | — | 415 | C | Semi-gloss |

As shown in Table 3, Examples 1, 5, 8, 9, 11, 20, and 22 in each of which the thickness of the iron-nickel diffusion layer 12 was 0.04 to 0.31 μm, and the total amount of the nickel contained in the iron-nickel diffusion layer and the nickel contained in the nickel layer was 10.8 to 26.7 g/m² (the thickness of the nickel plating layer 13 was 1.21 to 3.0 μm) gave the results that the hardness of any of these Examples fell within an appropriate range, and herewith, it is conceivable that any of these Examples was excellent in the processability and the suppression effect of the sticking to the mold when the surface-treated steel sheet 1 was processed into a battery container, and moreover excellent in the corrosion resistance when the surface-treated steel sheet 1 was used for the battery container.

On the other hand, as shown in Table 3, each of Comparative Examples 1, 2, and 13 free from the application of the thermal diffusion treatment underwent a too high hardness, and herewith there was an adverse possibility that when the surface treated steel sheet 1 was mold-processed into a battery container, deep cracks reaching the steel sheet 11 were generated, the iron of the steel sheet 11 was exposed, and the corrosion resistance was decreased.

Alternatively, even in the case where the thermal diffusion treatment was performed, when the total amount of the nickel contained in the iron-nickel diffusion layer and the nickel contained in the nickel layer was too small (the thickness of the nickel plating layer 13 was too thin), the hardness came to be too low as in Comparative Example 6, and herewith it is conceivable that the processability and the suppression effect of the sticking to the mold when the surface-treated steel sheet was processed into a battery container were poor.

Moreover, even in the case where the thermal diffusion treatment was performed, when the thickness of the iron-nickel diffusion layer 12 came to be too thick due to an excessive thermal diffusion treatment, the hardness was too low as in Comparative Examples 6 and 7, and herewith it is conceivable that the processability and the suppression effect of the sticking to the mold when the surface-treated steel sheet was processed into a battery container were poor.

REFERENCE SIGNS LIST

1 . . . surface-treated steel sheet
11 . . . steel sheet
12 . . . iron-nickel diffusion layer
13 . . . nickel plating layer
14 . . . nickel layer
2 . . . alkaline battery
21 . . . positive electrode can
211 . . . positive electrode terminal
22 . . . negative electrode terminal
23 . . . positive electrode mixture
24 . . . negative electrode mixture
25 . . . separator
26 . . . current collector
27 . . . gasket
28 . . . insulating ring
29 . . . exterior case

The invention claimed is:
1. A battery container, comprising:
a bottomed cylindrical shaped article made of a surface-treated steel sheet, wherein the surface-treated steel sheet comprises:
a steel sheet;
an iron-nickel diffusion layer formed on the steel sheet; and
a nickel layer formed on the iron-nickel diffusion layer and constituting the outermost layer, the nickel layer consisting of nickel,
wherein when the Fe intensity and the Ni intensity are continuously measured from the surface of the surface-treated steel sheet for a battery container along the depth direction with a high frequency glow discharge optical emission spectrometric analyzer, the thickness of the iron-nickel diffusion layer being the difference (D2−D1) between the depth (D1) at which the Fe intensity exhibits a first predetermined value and the depth (D2) at which the Ni intensity exhibits a second predetermined value is 0.04 to 0.31 μm, wherein the total amount of the nickel contained in the iron-nickel diffusion layer and the nickel contained in the nickel layer is 10.8 to 26.7 $g/m^2$, wherein the depth (D1) exhibiting the first predetermined value is the depth exhibiting an intensity of 10% of the saturated value of the Fe intensity measured by the above-described measurement, wherein the depth (D2) exhibiting the second predetermined value is the depth exhibiting an intensity of 10% of the maximum value when the measurement is further performed along the depth direction after the Ni intensity shows the maximum value by the above-described measurement, and wherein the iron-nickel diffusion layer is disposed on an inner surface of the bottomed cylindrical shaped article.

2. The battery container according to claim 1, wherein the ratio of the thickness of the iron-nickel diffusion layer to the thickness of the nickel layer (thickness of iron-nickel diffusion layer/thickness of nickel layer) is 0.013 to 0.50.

3. The battery container according to claim 1, wherein the thickness of the nickel layer is 1.0 μm or more.

4. The battery container according to claim 1, wherein the Vickers hardness (HV) of the nickel layer measured with a load of 10 gf is 220 to 280.

5. A battery provided with the battery container according to claim 1.

6. The battery container according to claim 1, wherein the bottomed cylindrical shaped article is a battery can.

7. The battery container according to claim 1, wherein the bottomed cylindrical shaped article is a positive electrode can.

8. A method for producing a battery container having a surface-treated steel sheet, said method comprising:
    forming a bottomed cylindrical shaped article having an inner surface; and
    forming the surface-treated steel sheet by a method comprising:
        forming a nickel plating layer on a surface of a steel sheet with a nickel amount of 10.8 to 26.7 $g/m^2$; and
        forming an iron-nickel diffusion layer and a nickel layer constituting an outermost layer by applying a heat treatment to the steel sheet having the nickel plating layer formed thereon by maintaining the steel sheet at a temperature of 450 to 600° C. for 30 seconds to 2 minutes,
    wherein the nickel plating layer is formed on the inner surface of the bottomed cylindrical shaped article and consists of nickel.

* * * * *